(12) United States Patent
Watanabe et al.

(10) Patent No.: US 8,833,334 B2
(45) Date of Patent: Sep. 16, 2014

(54) OIL PUMP APPARATUS

(75) Inventors: Kentaro Watanabe, Kariya (JP);
Motoyasu Yamamori, Nagoya (JP);
Ryouichi Takahata, Kitakatsuragi-gun (JP); Kazuya Ando, Okazaki (JP);
Naomasa Mukaide, Tokai (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/885,180

(22) PCT Filed: Nov. 17, 2011

(86) PCT No.: PCT/JP2011/076485
§ 371 (c)(1),
(2), (4) Date: May 14, 2013

(87) PCT Pub. No.: WO2012/067175
PCT Pub. Date: May 24, 2012

(65) Prior Publication Data
US 2013/0228148 A1    Sep. 5, 2013

(30) Foreign Application Priority Data

Nov. 19, 2010  (JP) ................................ 2010-258852
Feb. 10, 2011  (JP) ................................ 2011-026906

(51) Int. Cl.
*F01M 1/02*  (2006.01)
*F04C 11/00* (2006.01)
(Continued)

(52) U.S. Cl.
CPC ............... *F01M 1/02* (2013.01); *F04C 11/008* (2013.01); *F01C 21/108* (2013.01); *F04C 2/102* (2013.01); *F04C 14/265* (2013.01); *F04C 15/06* (2013.01); *F04C 11/001* (2013.01); *F16N 2013/063* (2013.01); *F04C 15/0026* (2013.01); *F04C 2230/60* (2013.01); *F01M 2001/0215* (2013.01); *F01M 2001/123* (2013.01)
USPC .................... 123/196 R; 417/354; 417/410.1; 417/410.4

(58) Field of Classification Search
CPC ......... F04C 2/102; F04C 11/008; F01M 1/02; F01M 2001/0215
USPC ........ 123/196 R; 417/354, 356, 410.4, 410.1, 417/363, 44.1, 530; 418/200, 205
See application file for complete search history.

(56) References Cited

U.S. PATENT DOCUMENTS 8,449,269 B2 * 5/2013 Yamamori et al. ............ 417/354
2006/0222527 A1 * 10/2006 Kurita et al. ................. 417/410.1
2011/0129364 A1 * 6/2011 Yamamori et al. ............ 417/363

FOREIGN PATENT DOCUMENTS

| JP | A-59-203892 | 11/1984 |
|----|-------------|---------|
| JP | A-02-153281 | 6/1990 |
| JP | U-06-073387 | 10/1994 |

(Continued)

OTHER PUBLICATIONS

International Search Report issued in International Application No. PCT/JP2011/076485 dated Dec. 27, 2011.

*Primary Examiner* — Noah Kamen
*Assistant Examiner* — Long T Tran
(74) *Attorney, Agent, or Firm* — Oliff PLC

(57) ABSTRACT

An oil pump apparatus in which an electrical pump can be easily disposed is provided. A mechanical pump including: an inner gear which is configured to be driven by an engine; and an outer gear which is configured to mesh with the inner gear, and an electrical pump including: an outer gear which is configured to be driven by a motor section; and an inner gear which is configured to mesh with the outer gear are installed adjacent to each other in the axial direction in a pump installation space of a pump housing having suction ports and ejection ports. A blocking plate which is configured to block communications between the suction ports and the ejection ports is disposed between the mechanical pump and the electrical pump.

7 Claims, 9 Drawing Sheets

(51) Int. Cl.
  *F01C 21/10* (2006.01)
  *F04C 2/10* (2006.01)
  *F04C 14/26* (2006.01)
  *F04C 15/06* (2006.01)
  *F04C 15/00* (2006.01)
  *F16N 13/06* (2006.01)
  *F01M 1/12* (2006.01)

(56) References Cited

FOREIGN PATENT DOCUMENTS

| | | |
|---|---|---|
| JP | A-09-025809 | 1/1997 |
| JP | A-11-257250 | 9/1999 |
| JP | A-2000-045955 | 2/2000 |
| JP | A-2005-030517 | 2/2005 |

\* cited by examiner

OIL PUMP APPARATUS

TECHNICAL FIELD

The present invention relates to an oil pump apparatus.

BACKGROUND ART

Conventionally, a configuration has been known in which, in order to supply oil for lubrication, working, control, and the like of various mechanisms during operation of an engine of a vehicle, a mechanical pump is installed into an automatic transmission (for example, see Patent Documents 1 and 2).

Moreover, a vehicle has been known in which an idling stop system for, when the vehicle is temporarily stopped, temporarily stopping an engine is mounted.

In a vehicle in which such an idling stop system is mounted, a mechanical pump is stopped in connection with temporary stop (idle stop) of an engine, and therefore an oil pressure cannot be supplied to a clutch mechanism and the like in an automatic transmission.

Therefore, a configuration has been known in which, in a vehicle in which an idling stop system is mounted, an electrical pump for supplying an oil pressure to a clutch mechanism and the like in an automatic transmission is disposed outside the automatic transmission.

PRIOR ART REFERENCE

Patent Documents

Patent Document 1: JP-UM-A-6-73387
Patent Document 2: JP-A-9-25809

SUMMARY OF THE INVENTION

Problem that the Invention is to Solve

In vehicles of various different types, there are cases where it is difficult to ensure a space for disposing an electrical pump. In such a case, an idling stop system cannot be employed.

In view of the above-discussed problem, it is an object of the invention to provide an oil pump apparatus in which an electrical pump can be easily disposed.

Means for Solving the Problem

In order to solve the problem, in the oil pump apparatus according to claim 1 of the invention, a mechanical pump including: an inner gear which is configured to be driven by an engine; and an outer gear which is configured to mesh with the inner gear, and an electrical pump including: an outer gear which is configured to be driven by a motor section; and an inner gear which is configured to mesh with the outer gear are installed adjacent to each other in an axial direction in a pump installation space of a pump housing having suction ports and ejection ports, and a blocking plate which is configured to block communications between the suction ports and the ejection ports is disposed between the mechanical pump and the electrical pump.

According to the configuration, the mechanical pump and the electrical pump can be easily installed in the pump housing having the suction ports and the ejection ports, while being adjacent to each other in the axial direction.

Also in a vehicle in which it is difficult to ensure a space for disposing an electrical pump outside an automatic transmission, therefore, it is possible to employ an idling stop system.

Moreover, the blocking plate can be disposed between the mechanical pump and the electrical pump to block the communications between the suction ports and the ejection ports.

During the operation of the electrical pump, therefore, an insufficient supply of oil due to the communications between the suction ports and the ejection ports can be prevented from occurring.

The oil pump apparatus according to claim 2 is the oil pump apparatus according to claim 1 wherein a one-way interlocking mechanism is disposed between the mechanical pump and the electrical pump, the one-way interlocking mechanism transmitting a power from a side of the mechanical pump to a side of the electrical pump, but blocking power transmission from the side of the electrical pump to the side of the mechanical pump.

According to the configuration, the power of the mechanical pump which is driven during operation of the engine is transmitted to the electrical pump by the one-way interlocking mechanism, whereby the electrical pump which is in an unenergized state is driven.

As compared to the case where an electrical pump is stopped during driving of a mechanical pump due to operation of an engine, therefore, the mechanical pump can be reduced in size by a degree corresponding to the supply amount of oil by the electrical pump. Consequently, the pump installation space of the pump housing can be reduced in size.

When the mechanical pump is stopped in connection with temporary stop of the engine, moreover, the electrical pump is operated to supply a required oil pressure.

In this case, the transmission of the power from the side of the electrical pump to the side of the mechanical pump is blocked by the one-way interlocking mechanism, and therefore the oil can be efficiently supplied.

The oil pump apparatus according to claim 3 is the oil pump apparatus according to claim 2 wherein the one-way interlocking mechanism includes: an interlock pin which is urged in a projection direction by an urging unit; and an interlock groove which is disengageably engaged with the interlock pin.

According to the configuration, the one-way interlocking mechanism can be configured by the simple structure formed by the interlock pin which is urged by the urging unit, and the interlock groove, the space for placing the one-way interlocking mechanism is easily ensured, and this is very effective in reducing the cost.

The oil pump apparatus according to claim 4 is the oil pump apparatus according to claim 1 wherein, during operation of the engine, an electric current is supplied to the motor section of the electrical pump, and the electrical pump is drivable.

According to the configuration, during operation of the engine, the mechanical pump is driven. In this case, an electric current is supplied to the motor section of the electrical pump, and the electrical pump is driven. As compared to the case where an electrical pump is stopped during driving of a mechanical pump due to operation of an engine, therefore, the mechanical pump can be reduced in size by a degree corresponding to the supply amount of oil by the electrical pump. Consequently, the pump installation space of the pump housing can be reduced in size.

The oil pump apparatus according to claim 5 is the oil pump apparatus according to any one of claims 1 to 3 wherein the electrical pump is rotatable at a rotational speed that is higher than a speed at which the mechanical pump is rotated during operation of the engine.

According to the configuration, the electrical pump and the mechanical pump can be reduced in size by a degree corresponding to the configuration where the electrical pump is rotated at a rotational speed that is higher than the rotational speed of the mechanical pump during operation of the engine. Then, the pump installation space of the pump housing can be reduced in size by a degree corresponding to the size reduction of the electrical pump.

MODE FOR CARRYING OUT THE INVENTION

Modes for carrying out the invention will be described by way of embodiments.
Embodiment 1

An oil pump apparatus of Embodiment 1 of the invention will be described with reference to FIGS. 1 to 6.

Figure 1:
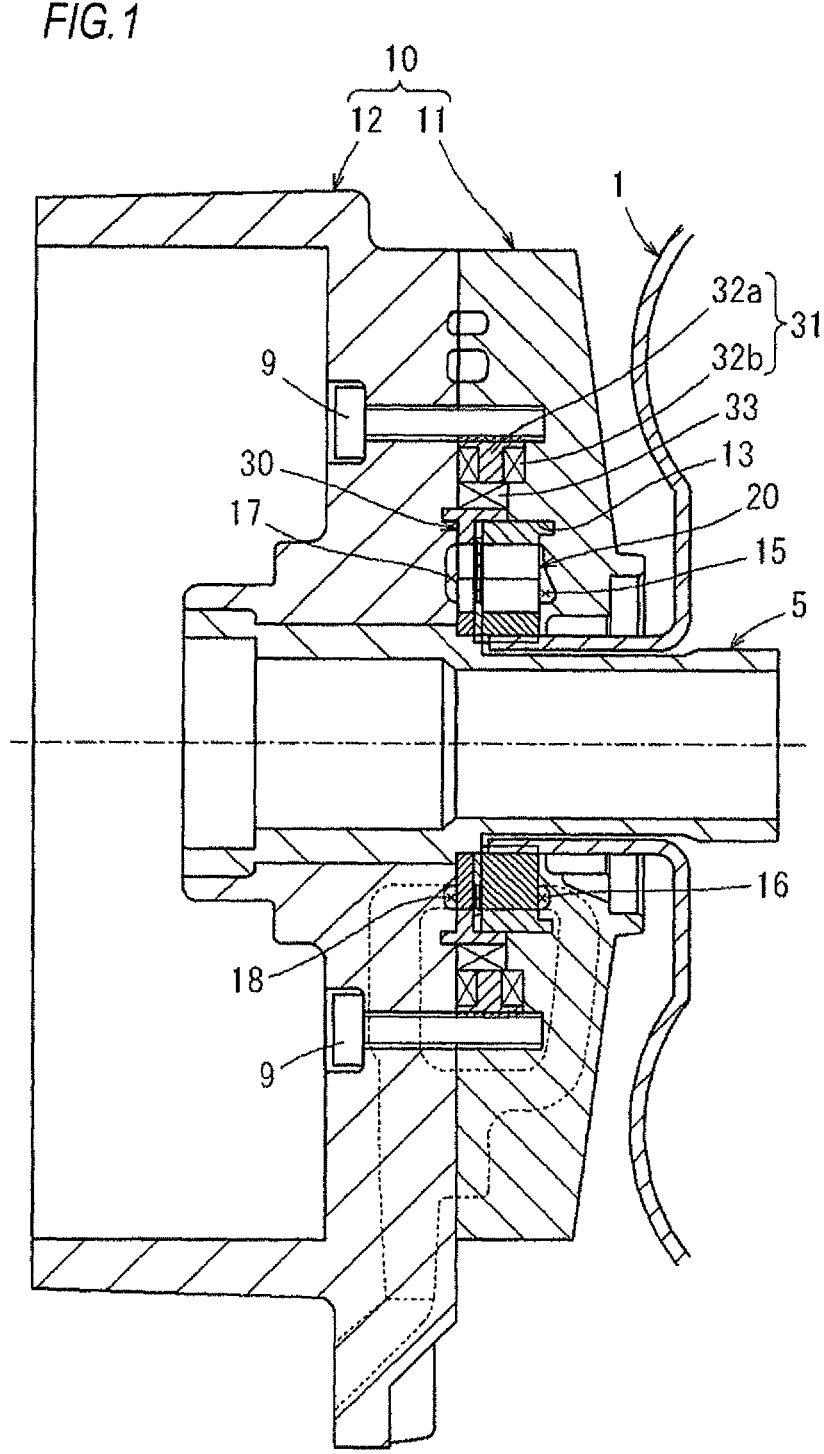
FIG. 1 is a longitudinal sectional view showing an oil pump apparatus of Embodiment 1 of the invention.

As shown in FIG. 1, in an oil pump apparatus which is installed in a torque converter 1 of an automatic transmission, a pump housing 10 which is fixed to the casing (not shown) of the automatic transmission by bolts is configured by coupling first and second two housing members 11, 12, which are divided from each other in the lateral direction in FIG. 1, to each other by bolts 9. A pump installation space 13 is formed between the first and second two housing members 11, 12. More specifically, the pump installation space 13 is formed by: an installation recess portion which is axially recessed in a center portion of the inner wall surface of the first housing member 11 that is opposed to the second housing member 12; and the inner wall surface of the second housing member 12 that is opposed to the first housing member 11.

Suction ports 15, 17 and ejection ports 16, 18 are formed in the opposed inner wall surfaces of the first and second two housing members 11, 12, respectively.

A stator shaft 5 which is directed toward the interior of a sleeve 2 of the torque converter 1 is formed in a center portion of the second housing member 12.

Figure 2:
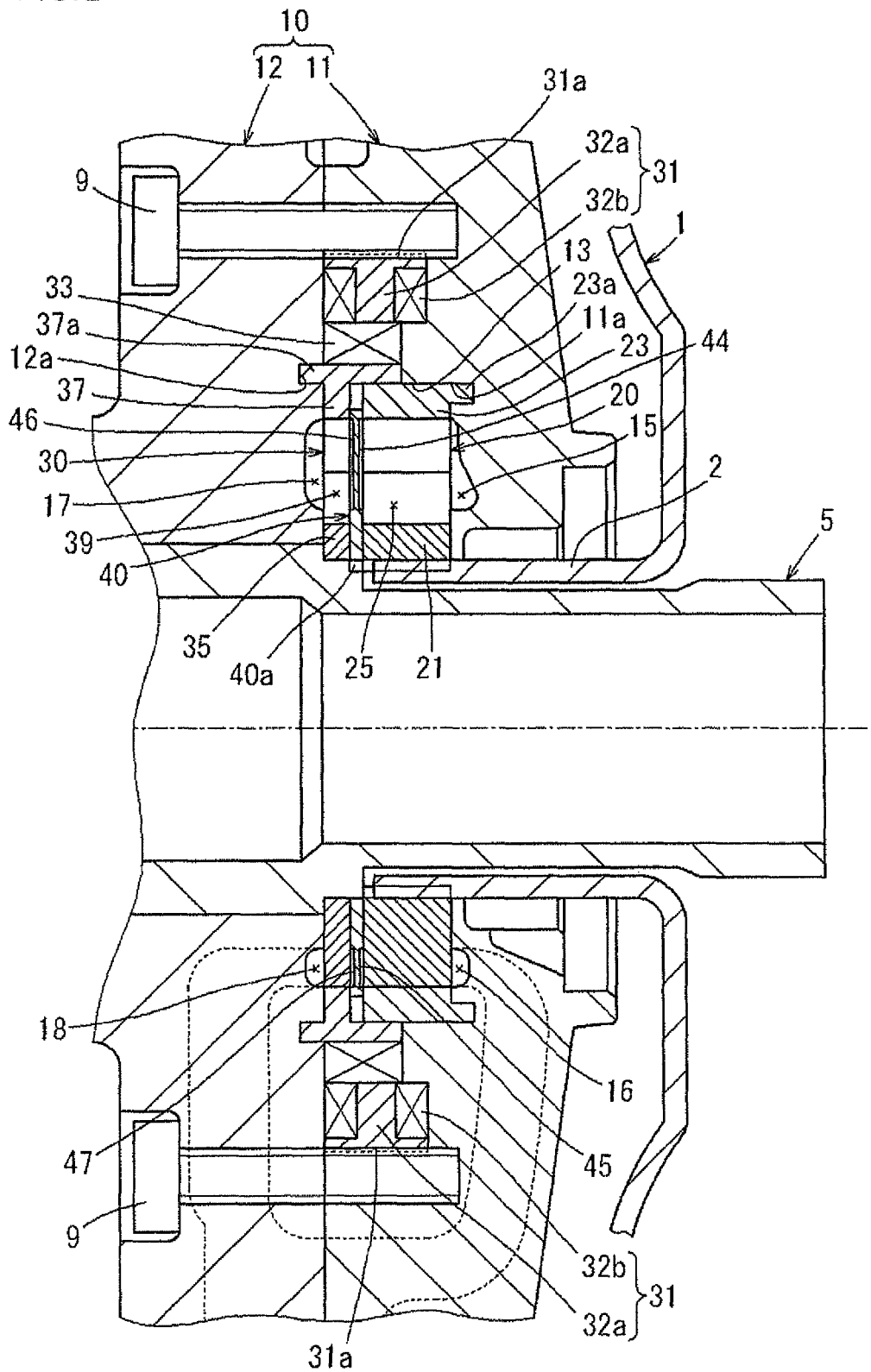
FIG. 2 is a longitudinal sectional view enlargedly showing a state where a mechanical pump and an electrical pump are installed in a pump housing in the apparatus.
Figure 4:
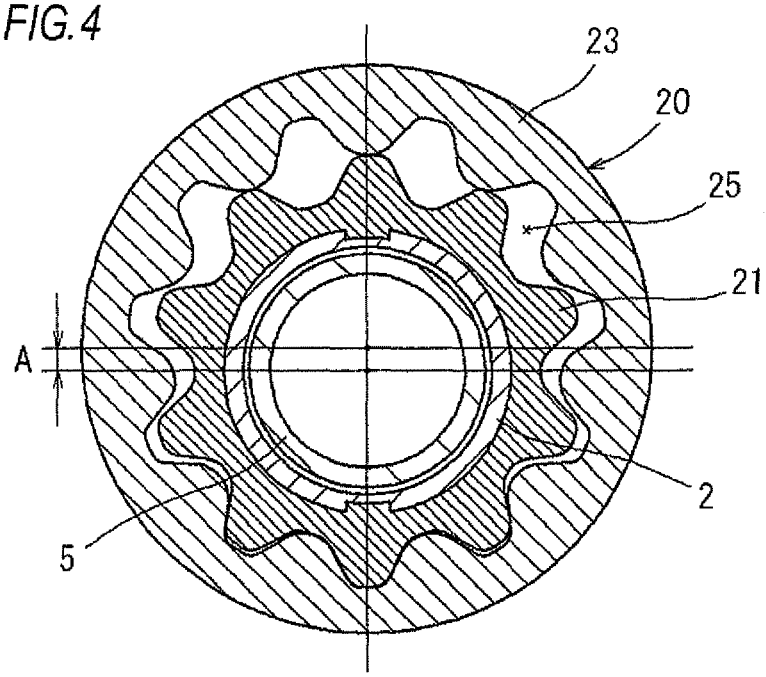
FIG. 4 is a front view showing a state where a meshing state of an inner gear and outer gear of the mechanical pump in the apparatus.

In the pump installation space 13 of the pump housing 10, as shown in FIGS. 2 and 4, a mechanical pump 20 which is to be driven during operation of an engine, and an electrical pump 30 which is to be driven during temporary stop of the engine are installed adjacent to each other in the axial direction.

The mechanical pump 20 includes an inner gear 21 and an outer gear 23, and is installed in the pump installation space 13 on the side of the first housing member 11.

The inner gear 21 of the mechanical pump 20 has a center hole which is to be coupled to the sleeve 2 of the torque converter 1 in a power transmittable manner. A plurality of external teeth are formed in the circumferential direction on the outer circumferential surface.

Moreover, the outer gear 23 is eccentric to the center of the inner gear 21 (in FIG. 4, eccentric by an eccentric amount A), and a plurality of internal teeth which mesh with the plurality of external teeth of the inner gear 21 are formed in the circumferential direction on the inner circumferential surface.

Furthermore, an oil confining portion 25 is formed between the external teeth of the inner gear 21 and the internal teeth of the outer gear 23, the inner gear 21 receives the power transmission from the sleeve 2 of the torque converter 1 to be rotated, and, in accordance with this, the outer gear 23 is followingly rotated to exert a pumping action.

In Embodiment 1, as shown in FIG. 2, a convex portion 23a is formed on one side surface (the surface opposed to the bottom surface of the installation recess portion of the first housing member 11) of the outer gear 23 of the mechanical pump 20, and a concave portion 11a into which the convex portion 23a is fitted to be engaged therewith is formed in the bottom surface of the installation recess portion of the first housing member 11. The mechanical pump 20 is installed in the pump installation space 13, and the convex portion 23a and the concave portion 11a are fitted to be engaged with each other, whereby the mechanical pump 20 is supported by the first housing member 11.

Figure 3:
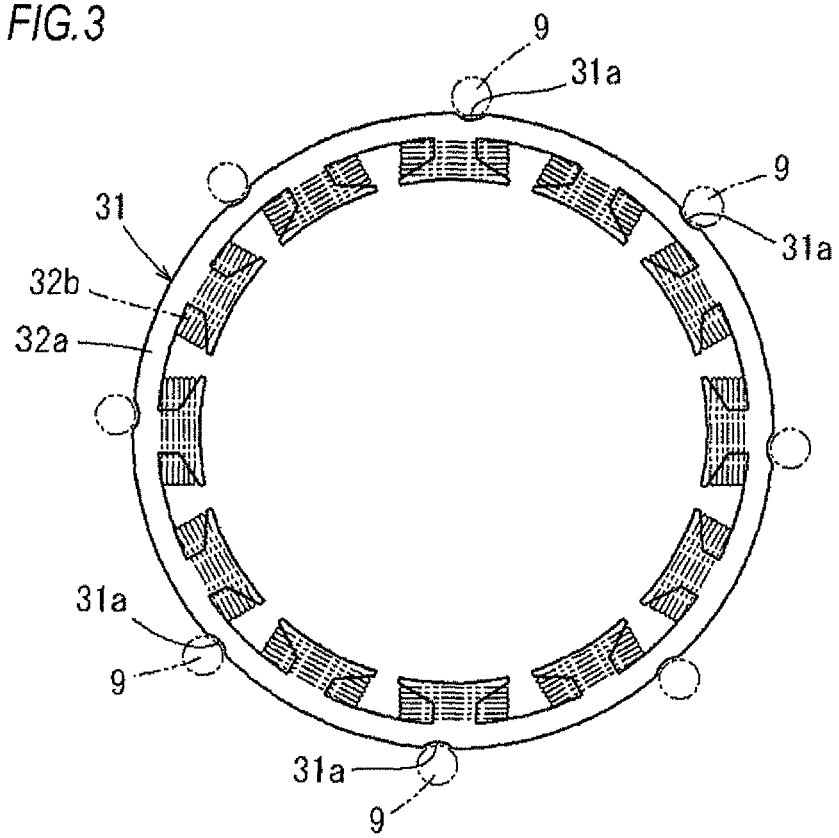
FIG. 3 is a front view showing a stator of a motor section of the electrical pump in the apparatus.
Figure 5:
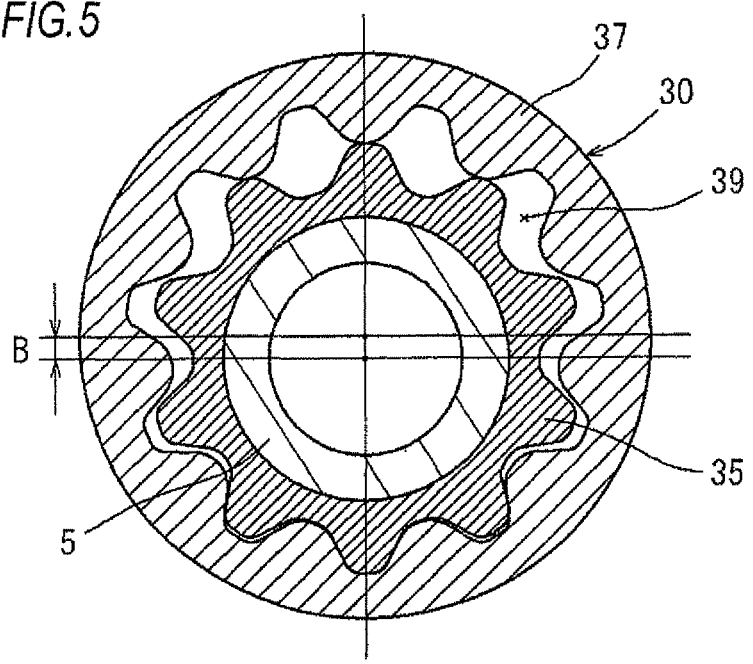
FIG. 5 is a front view showing a state where a meshing state of an inner gear and outer gear of the electrical pump in the apparatus.

As shown in FIGS. 2 and 5, the electrical pump 30 is installed in the pump installation space 13 on a side of the second housing member 12, and includes a motor section having a stator 31 and a rotor 33, an inner gear 35, and an outer gear 37, As shown in FIGS. 2 and 3, the stator 31 of the electrical pump 30 includes a core portion 32a, and a plurality of coils 32b which are attached to a plurality of coil attaching portions formed in the circumferential direction in the inner circumferential surface of the core portion 32a, respectively. Furthermore, the stator 31 is fixed between the first and second two housing members 11, 12 by means of the degree of interference of the bolts 9 which fasten together the first and second two housing members 11, 12.

Arcuate cutaway recesses 31a are formed in a plurality of places (corresponding places of the plurality of coils 32b) of the outer circumferential surface of the core portion 32a of the stator 31. When the first and second two housing members 11, 12 are fastened together by the plurality of bolts 9, the threaded portions of the plurality of bolts 9 are passed over the cutaway recesses 31a, and the threaded portions of the plurality of bolts 9 are engaged with the plurality of cutaway recesses 31a. The stator 31 is firmly rotation-locked by means of the engagement force exerted between the threaded portions of the plurality of bolts 9 and the plurality of cutaway recesses 31a.

Namely, at the same time when the first and second two housing members 11, 12 are fastened together by the plurality of bolts 9, the fixation of the stator 31 can be performed. Since the threaded portions of the plurality of bolts 9 are passed over the cutaway recesses 31a, the diameter of the whole apparatus including the first and second two housing members 11, 12 can be suppressed from being excessively increased, and the space for placing the electrical pump 30 can be easily ensured.

Moreover, S- and N-pole magnets (not shown) corresponding to the plurality of coils 32b are alternately arranged in the circumferential direction on the outer circumferential surface of the rotor 33.

The inner gear 35 of the electrical pump 30 has a center hole which allows the inner gear to be rotatably fitted onto the outer circumferential surface of the stator shaft 5, and a plurality of external teeth are formed in the circumferential direction on the outer circumferential surface.

In the outer gear 37, moreover, an outer circumferential portion is disposed so as to be able to transmit a power to an inner circumferential portion of the rotor 33 of the motor section. The outer gear is eccentric to the center of the inner gear 35 (in FIG. 5, eccentric by an eccentric amount B), and a plurality of internal teeth which mesh with the plurality of external teeth of the inner gear 35 are formed in the circumferential direction on the inner circumferential surface.

Furthermore, an oil confining portion 39 is formed between the external teeth of the inner gear 35 and the internal teeth of the outer gear 37.

The outer gear 37 receives the power transmission from the motor section to be rotated, and, in accordance with this, the inner gear 35 is followingly rotated to exert a pumping action.

In Embodiment 1, as shown in FIG. 2, a convex portion 37a is formed on one side surface (the surface opposed to the inner wall surface of the second housing member 12) of the outer gear 37 of the electrical pump 30, and a concave portion 12a into which the convex portion 37a is rotatably fitted to be engaged therewith is formed in the inner wall surface of the second housing member 12. The electrical pump 30 is installed in the pump installation space 13, and the convex portion 37a and the concave portion 12a are rotatably fitted to be engaged with each other, whereby the outer gear 37 of the electrical pump 30 is stably supported by the second housing member 12.

Moreover, the inner gear 35 and outer gear 37 of the electrical pump 30 are formed to have the same diameter as the inner gear 21 and outer gear 23 of the mechanical pump 20, and, also with respect to the eccentric amounts A, B, set so as to be equal to each other.

Furthermore, the oil amount which is required for supplying oil to a clutch mechanism and the like in the automatic transmission during temporary stop of the engine can be reduced by a fraction from that which is required for supplying oil for performing lubrication, working, control, and the like of various mechanisms during operation of the engine. Therefore, the inner gear 35 and outer gear 37 of the electrical pump 30 are formed to be thinner by a fraction than the inner gear 21 and outer gear 23 of the mechanical pump 20.

The electrical pump 30 is connected to a control apparatus which is not shown, and rotation-controlled based on set programs.

Figure 6:
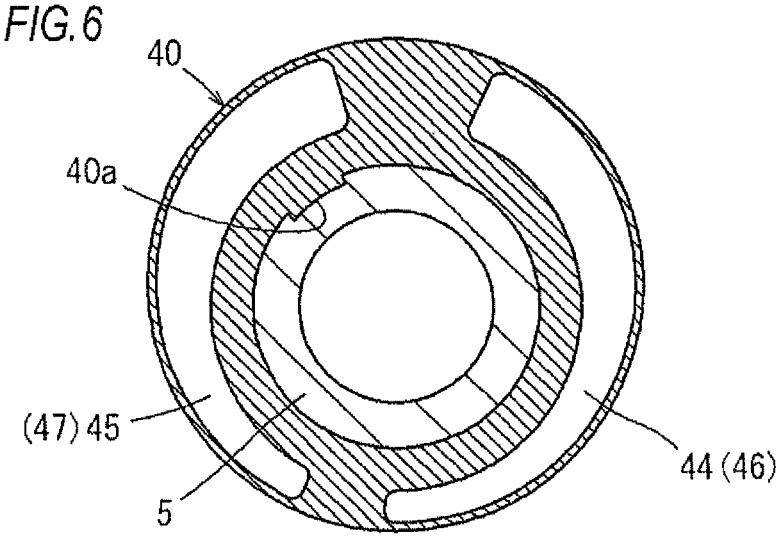
FIG. 6 is a front view showing a blocking plate in the apparatus.

As shown in FIGS. 2 and 6, a blocking plate 40 which has a circular plate-like shape, and which blocks communications between the suction ports 15, 17 and the ejection ports 16, 18 is disposed between the mechanical pump 20 and the electrical pump 30.

In Embodiment 1, a key 40a which is engaged with a key groove formed in the outer circumferential surface of the stator shaft 5 to lock rotation is formed in the inner circumferential surface of a center hole of the blocking plate 40.

Port grooves 44, 45 having the same size and shape as the suction port 15 and ejection port 16 of the first housing member 11 are formed as required in one side surface of the blocking plate 40 in order to maintain equalization of the oil pressures in the suction port 15 and the ejection port 16. Furthermore, port grooves 46, 47 having the same size and shape as the suction port 17 and ejection port 18 of the second housing member 12 are formed as required in the other side surface of the blocking plate 40 in order to maintain equalization of the oil pressures in the suction port 17 and the ejection port 18.

The oil pump apparatus of Embodiment 1 is configured as described above.

During operation of the engine, therefore, the inner gear 21 of the mechanical pump 20 receives the power transmission from the sleeve 2 of the torque converter 1 to be rotated, and, in accordance with this, the outer gear 23 is followingly rotated, whereby the oil sucked from the suction port 15 of the first housing member 11 is ejected from the ejection port 16 through the oil confining portion 25 which is formed between the inner gear 21 and the outer gear 23, to be supplied to various mechanisms. This allows lubrication, working, control, and the like of various mechanisms to be performed.

During temporary stop (idle stop) of the engine, the motor section of the electrical pump 30 operates, and the outer gear 37 receives power transmission of the rotor 33 to be rotated. In accordance with the rotation of the outer gear 37, the inner gear 35 is followingly rotated, whereby the oil sucked from the suction port 17 of the second housing member 12 is ejected from the ejection port 18 through the oil confining portion 39 which is formed between the inner gear 35 and the outer gear 37, to be supplied to the clutch mechanism and the like in the automatic transmission.

Moreover, the mechanical pump 20 and the electrical pump 30 can be easily installed in the pump installation space 13 of the pump housing 10 having the suction ports 15, 17 and the ejection ports 16, 18, while being adjacent to each other in the axial direction.

Therefore, the necessity for ensuring a space for disposing the electrical pump 30 outside the pump housing 10 can be eliminated, and an idling stop system can be easily employed.

Moreover, the communications between the suction ports 15, 17 and ejection ports 16, 18 of the pump housing 10 can be blocked by disposing the blocking plate 40 between the mechanical pump 20 and the electrical pump 30. During the operation of the electrical pump 30, therefore, an insufficient supply of oil due to the communications between the suction ports 15, 17 and the ejection ports 16, 18 can be prevented from occurring.

In Embodiment 1, the case where the electrical pump 30 is rotation-controlled so as to be stopped during operation of the engine has been exemplified. Alternatively, a configuration may be possible where, also during operation of the engine, an electric current is supplied to the motor section of the electrical pump 30 to drive-control the electrical pump 30.

In this case, the mechanical pump 20 can be reduced in size by a degree corresponding to the supply amount of oil by the electrical pump 30 as compared to the case where the electrical pump 30 is stopped during operation of the engine.

Moreover, the electrical pump 30 may be rotation-controlled so that the rotational speed is higher (for example, higher by about 1.5 to 2 times) than that of the mechanical pump 20 during operation of the engine.

In this case, the electrical pump 30 and the mechanical pump 20 can be reduced in size by a degree corresponding to the configuration where the electrical pump 30 is rotated at a higher speed.

Embodiment 2

Next, an oil pump apparatus of Embodiment 2 of the invention will be described with reference to FIGS. 7 to 12.

Embodiment 2 is configured so that the electrical pump 30 is driven in conjunction with the mechanical pump 20 which is driven during operation of the engine.

Figure 7:
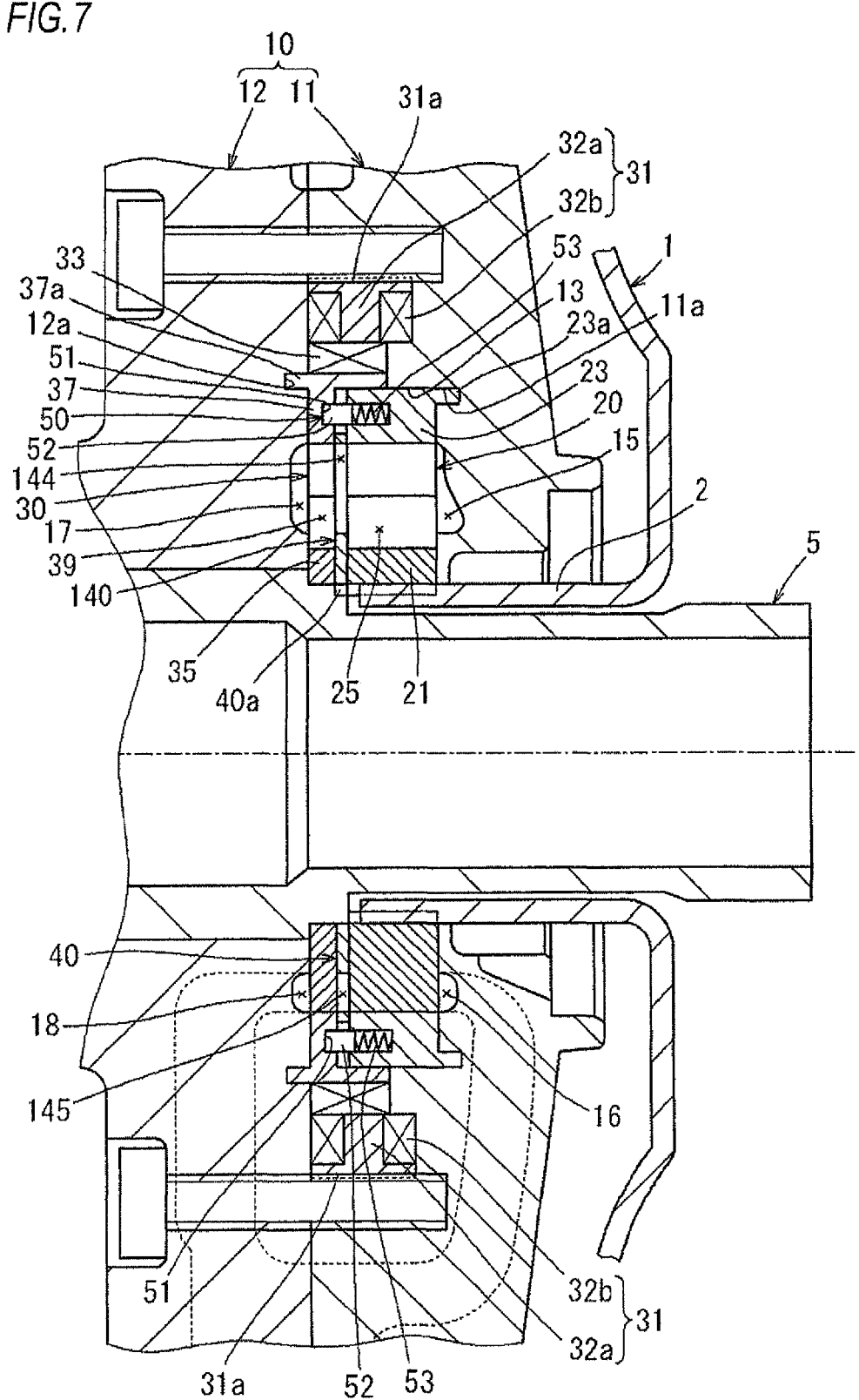
FIG. 7 is a longitudinal sectional view enlargedly showing a state where a mechanical pump and an electrical pump are installed in a pump housing in an oil pump apparatus of Embodiment 2 of the invention.
Figure 8:
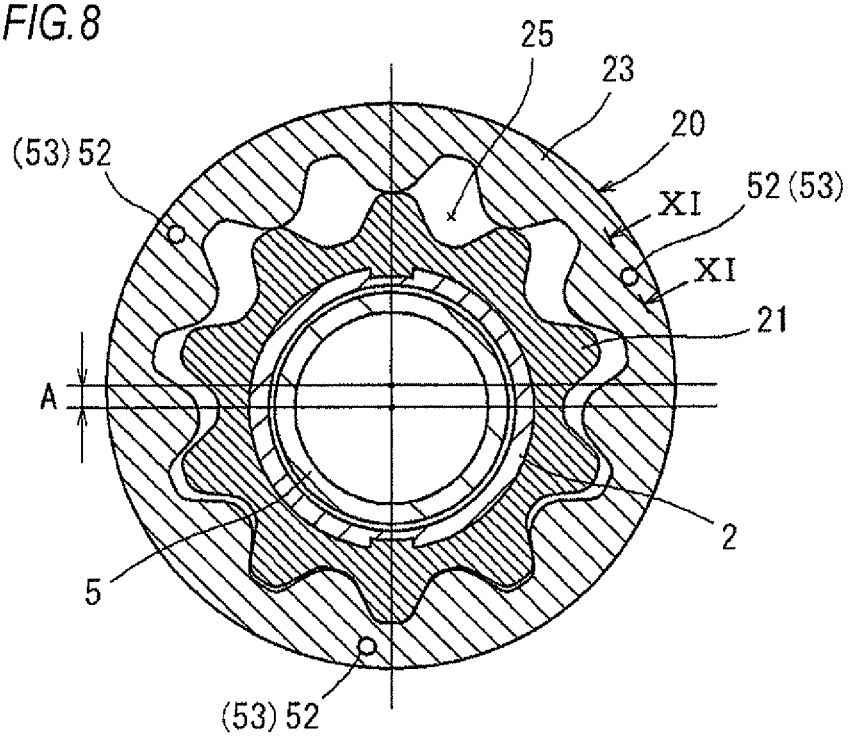
FIG. 8 is a front view showing a state where a meshing state of an inner gear and outer gear of the mechanical pump in the apparatus.
Figure 9:
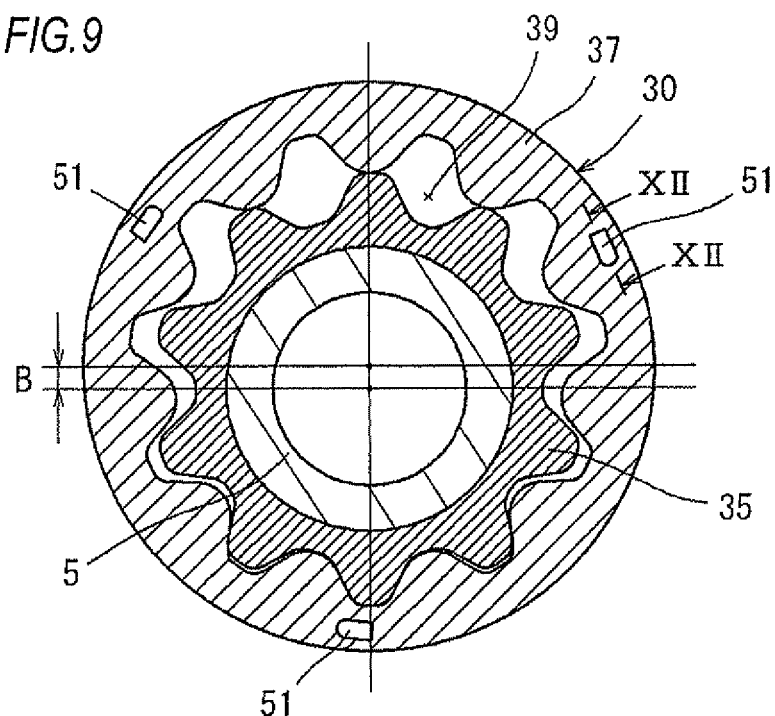
FIG. 9 is a front view showing a state where a meshing state of an inner gear and outer gear of the electrical pump in the apparatus.

As shown in FIG. 7, namely, a one-way interlocking mechanism (one-way clutch) 50 which transmits a power from the side of the mechanical pump 20 to that of the electrical pump 30, but which blocks a power from the side of the electrical pump 30 to that of the mechanical pump 20 is disposed between the mechanical pump 20 and the electrical pump 30.

Figure 11:
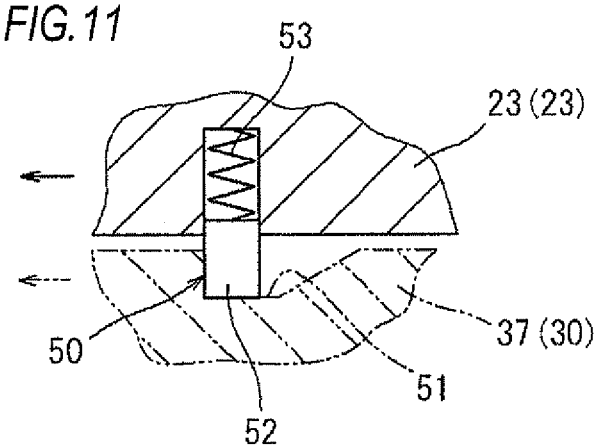
FIG. 11 is a sectional view showing a state where a driving force of the mechanical pump in the apparatus is transmitted to the electrical pump by an interlock pin and interlock groove of a one-way interlocking mechanism, taken along line XI-XI in FIG. 8.
Figure 12:
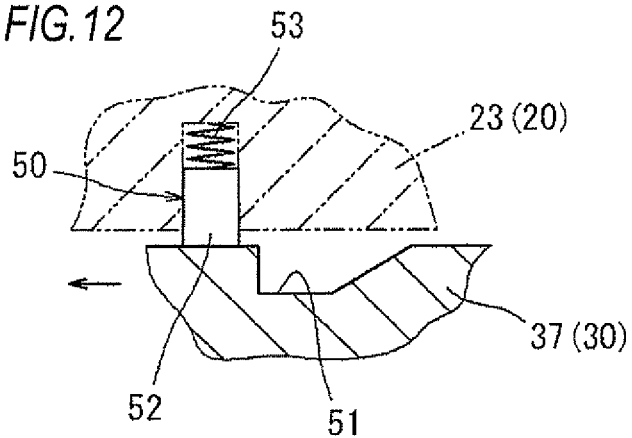
FIG. 12 is a sectional view showing a state where, during stop of the mechanical pump in the apparatus, a driving force of the electrical pump is blocked by the one-way interlocking mechanism, taken along line XII-XII in FIG. 9.

In Embodiment 2, as shown in FIGS. 11 and 12, the one-way interlocking mechanism 50 is configured by: interlock pins 52 which are disposed in a plurality of places of a peripheral edge portion of an opposing surface of one of the outer gear 23 of the mechanical pump 20 and the outer gear 37 of the electrical pump 30, and which are urged in a projection direction by springs 53 functioning as an urging unit; and interlock grooves 51 which are disposed in a plurality of places of a peripheral edge portion of an opposing surface of the other member, and which are disengageably engaged with the interlock pins 52.

Figure 10:
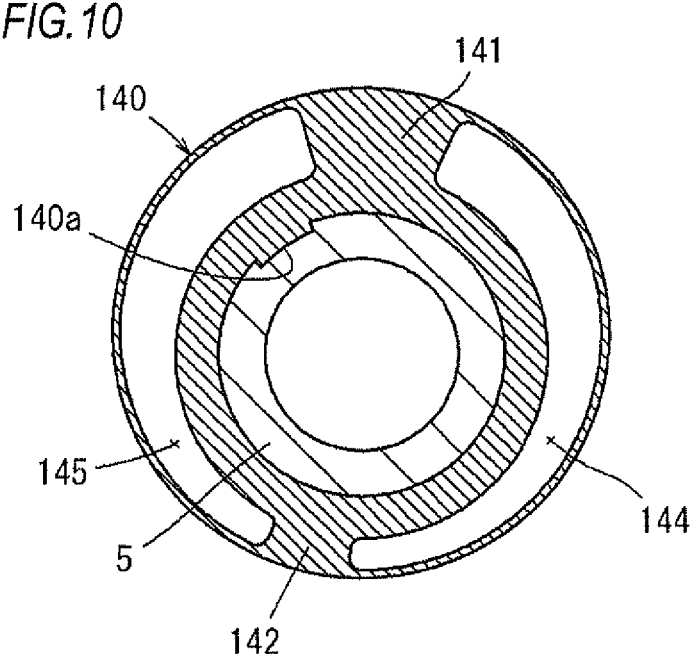
FIG. 10 is a front view showing a blocking plate in the apparatus.

As shown in FIGS. 7 and 10, a blocking portion 141 which blocks communications between the suction ports 15, 17 and ejection ports 16, 18 of the pump housing 10 is formed in a blocking plate 140 which is disposed between the mechanical pump 20 and the electrical pump 30 while being rotation-locked to the outer circumferential surface of the stator shaft 5.

In the blocking plate 140, a suction port communicating portion 144 and ejection port communicating portion 145 which are configured by cutaway portions or through holes having the same size and shape as the suction ports 15, 17 of the first housing member 11 and the ejection ports 16, 18 of the second housing member 12 are formed in order to maintain equalization of the oil pressures in the suction port 15 and the ejection port 16, and the suction port 17 and the ejection port 18.

Similarly with Embodiment 1, moreover, a key 140a which is engaged with a key groove formed in the outer circumferential surface of the stator shaft 5 to lock rotation is formed in the inner circumferential surface of a center hole of the blocking plate 140 (see FIG. 10).

The other configuration of Embodiment 2 is configured in a similar manner as Embodiment 1. Therefore, identical components are denoted by the same reference numerals, and their description is omitted.

The oil pump apparatus of Embodiment 2 is configured as described above.

As shown in FIG. 11, therefore, the power of the mechanical pump 20 which is driven during operation of the engine, i.e., the rotational force of the outer gear 23 of the mechanical pump 20 is transmitted to the outer gear 37 of the electrical pump 30 by means of the coupling force exerted between the interlock grooves 51 and interlock pins 52 of the one-way interlocking mechanism 50, whereby the electrical pump 30 which is in an unenergized state is driven together with the mechanical pump 20.

As compared to the case of Embodiment 1 where the electrical pump 30 is stopped during driving of the mechanical pump 20, the mechanical pump 20 can be reduced in size by a degree corresponding to the supply amount of oil by the electrical pump 30. Consequently, the pump installation space 13 of the pump housing 10 can be reduced in size.

When the mechanical pump 20 is stopped in connection with temporary stop of the engine, moreover, the electrical pump 30 is operated to supply a required oil pressure.

In this case, as shown in FIG. 12, the interlock grooves 51 and interlock pins 52 of the one-way interlocking mechanism 50 are in the direction along which their engagement is cancelled. Therefore, the transmission of the power from the electrical pump 30 to the side of the mechanical pump 20 is blocked by the one-way interlocking mechanism 50, and hence the oil can be efficiently supplied.

In Embodiment 2, the one-way interlocking mechanism 50 can be configured by the simple structure formed by the interlock pins 52 which are urged by the springs 53 functioning as an urging unit, and the interlock grooves 52. Therefore, the space for placing the one-way interlocking mechanism 50 is easily ensured, and this is very effective in reducing the cost.

Embodiment 3

Figure 13:
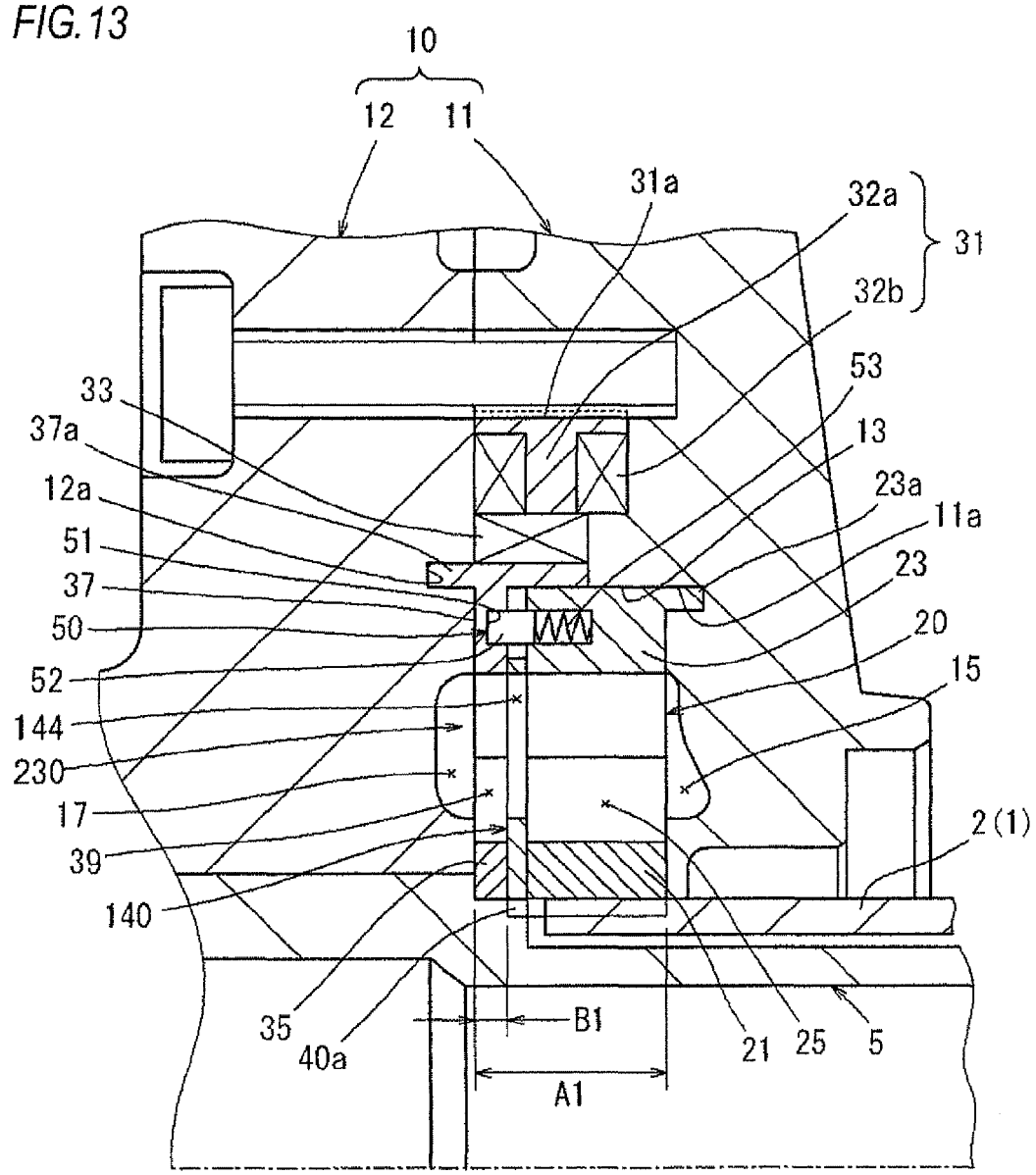
FIG. 13 is a longitudinal sectional view enlargedly showing a state where a mechanical pump and an electrical pump are installed in a pump housing in an oil pump apparatus of Embodiment 3 of the invention.

Next, an oil pump apparatus of Embodiment 3 of the invention will be described with reference to FIG. 13.

Embodiment 3 is configured so that, also during operation of the engine which drives the mechanical pump 20, an electric current is supplied to the motor section (coils 32b) of an electrical pump 230 so that the electrical pump 230 is drivable.

In Embodiment 3, in order that the axial length A1 of the pump installation space 13 of the pump housing 10 is further shortened to achieve miniaturization, particularly, the thickness (axial dimension) B1 of the inner gear 35 and outer gear 37 of the electrical pump 230 is set so as to be shorter than that in Embodiment 2.

Programs of a control apparatus that rotation-controls the electrical pump 230, and that is not shown are set so that, during, for example, operation of a brake in which a larger oil amount is required than during normal traveling, the supply amount of oil does not become insufficient. Namely, the embodiment is configured so that, during, for example, operation of a brake in which a larger oil amount is required than during normal traveling, the rotational speed of the electrical pump 230 is controlled so as to be higher (for example, higher by about 1.5 to 2 times) than that of the mechanical pump 20 during operation of the engine, based on the programs of the control apparatus.

The other configuration of Embodiment 3 is configured in a similar manner as Embodiment 2. Therefore, identical components are denoted by the same reference numerals, and their description is omitted.

The oil pump apparatus of Embodiment 3 is configured as described above.

Also in Embodiment 3, similarly with Embodiment 2, therefore, the power of the mechanical pump 20 which is driven during operation of the engine, i.e., the rotational force of the outer gear 23 of the mechanical pump 20 is transmitted to the outer gear 37 of the electrical pump 230 by means of the coupling force exerted between the interlock grooves 51 and interlock pins 52 of the one-way interlocking mechanism 50, whereby the electrical pump 230 which is in an unenergized state is driven together with the mechanical pump 20.

In Embodiment 3, during, for example, operation of the brake in which a larger oil amount is required than during normal traveling, particularly, an electric current is supplied to the motor section of the electrical pump 230, so that the electrical pump 230 is driven. At this time, the rotational speed of the electrical pump 230 is higher than that of the mechanical pump 20 during operation of the engine.

Therefore, the electrical pump 230 and the mechanical pump 20 can be reduced in size (shortened in the axial direction) by a degree corresponding to the increase of the rotational speed at which the electrical pump 230 is rotated, and which is higher than that of the mechanical pump 20 during operation of the engine. Then, the axial length A1 of the pump installation space 13 of the pump housing 10 can be reduced by a degree corresponding to the size reduction of the electrical pump 230 and the mechanical pump 20. Also in a vehicle where the axial length A1 of the pump installation space 13 of the pump housing 10 is limited to a small value, therefore, the mechanical pump 20 and the electrical pump 230 can be easily installed into the pump installation space 13 of the pump housing 10.

During temporary stop (idle stop) of the engine, moreover, the rotational speed of the electrical pump 230 in Embodiment 3 is controlled to be higher than that of the electrical pump 30 in Embodiment 2, whereby the amount of oil which is required in the clutch mechanism and the like in the automatic transmission can be supplied without insufficiency.

Embodiment 4

Figure 14:
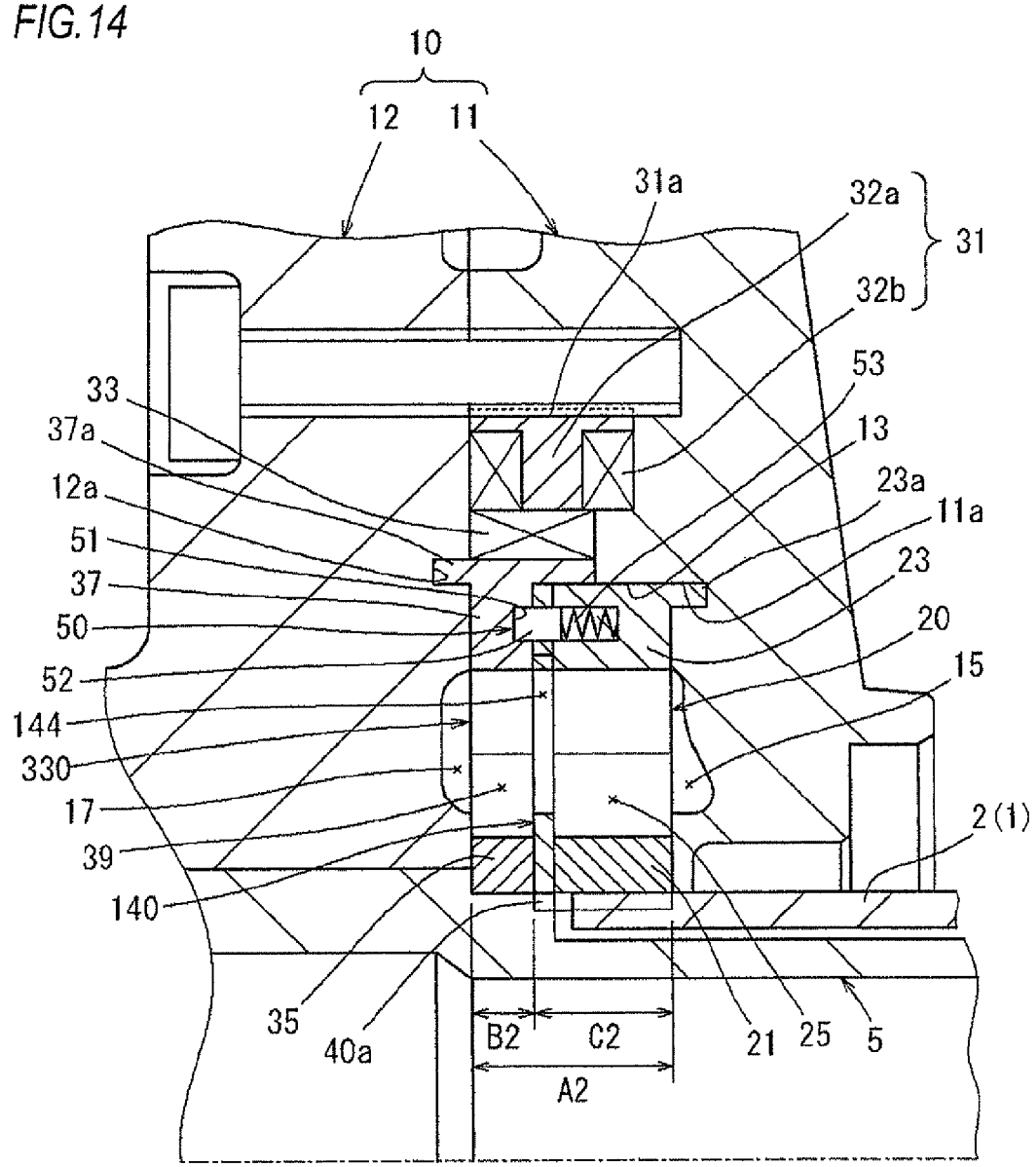
FIG. 14 is a longitudinal sectional view enlargedly showing a state where a mechanical pump and an electrical pump are installed in a pump housing in an oil pump apparatus of Embodiment 4 of the invention.

Next, an oil pump apparatus of Embodiment 4 of the invention will be described with reference to FIG. 14.

In Embodiment 4, in order to reduce the sliding resistance (loss torque) due to operation of an electrical pump 330 during temporary stop (idle stop) of the engine, the rotational speed (number of rotations) of the electrical pump 330 in temporary stop of the engine is set to be lower than that in Embodiment 2.

In order to prevent the ejection amount of oil from being reduced by the reduction of the rotational speed of the electrical pump 330, moreover, the thickness (axial dimension) B2 of the inner gear 35 and outer gear 37 of the electrical pump 330 is set so as to be larger than that of the inner gear 35 and outer gear 37 of the electrical pump 30 in Embodiment 2.

In Embodiment 4, the thickness B2 of the inner gear 35 and outer gear 37 of the electrical pump 330 is increased about two times of that of the inner gear 35 and outer gear 37 of the electrical pump 30 in Embodiment 2, and the rotational speed (number of rotations) of the electrical pump 330 in temporary stop of the engine is set to be lowered to about ½ of that of the electrical pump 30 in Embodiment 2

As indicated by Expression 1 below, the sliding resistance (loss torque) T due to operation of the electrical pump 330 is proportional to the fourth power of the gear diameter (pitch circle of the external teeth of the inner gear 35), and the rotational number ω of the electrical pump 30, and inversely proportional to the side clearance (gaps between the side surfaces of the inner gear 35 and outer gear 37 of the electrical pump 330, and the side surfaces of the housing and the blocking plate 140 which are opposed to the side surfaces) h.

$$T \propto \frac{r^4 \times \omega}{h_\gamma} \quad \text{[Exp. 1]}$$

The thickness C2 of the inner gear 21 and outer gear 23 of the mechanical pump 20 is set to be smaller by a degree corresponding to the size increase of the thickness B2 of the inner gear 35 and outer gear 37 of the electrical pump 330. Therefore, the axial length A2 of the pump installation space 13 of the pump housing 10 is set to have the same value as that in Embodiment 2, so that the ejection amount of oil during operation of the engine is ensured.

The other configuration of Embodiment 4 is configured in a similar manner as Embodiment 2. Therefore, identical components are denoted by the same reference numerals, and their description is omitted.

The oil pump apparatus of Embodiment 4 is configured as described above.

Also in Embodiment 4, similarly with Embodiment 2, therefore, the power of the mechanical pump 20 which is driven during operation of the engine, i.e., the rotational force of the outer gear 23 of the mechanical pump 20 is transmitted to the outer gear 37 of the electrical pump 330 by means of the coupling force exerted between the interlock grooves 51 and interlock pins 52 of the one-way interlocking mechanism 50, whereby the electrical pump 330 which is in an unenergized state is driven together with the mechanical pump 20.

During temporary stop (idle stop) of the engine, moreover, the electrical pump 330 in Embodiment 4 is rotation-controlled at a rotational speed which is lower (for example, lower by about ½) than that of the electrical pump 30 in Embodiment 2, whereby the sliding resistance (loss torque) T due to operation of the electrical pump 330 can be reduced (see Exp. 1).

Moreover, the thickness B2 of the inner gear 35 and outer gear 37 of the electrical pump 330 is increased (for example, by about two times) as compared to Embodiment 2, whereby the amount of oil which is required in the clutch mechanism and the like in the automatic transmission can be supplied without insufficiency.

Moreover, the thickness C2 of the inner gear 21 and outer gear 23 of the mechanical pump 20 is set to be smaller by the degree corresponding to the size increase of the thickness 32 of the inner gear 35 and outer gear 37 of the electrical pump 330. This enables the mechanical pump 20 and the electrical pump 330 to be easily installed within the axial length A2 of the pump installation space 13 of the pump housing 10, and the ejection amount of oil during operation of the engine to be ensured.

The invention is not limited to Embodiments 1 to 4 described above, and may be variously implemented without departing from the spirit of the invention.

In Embodiments 2 to 4, for example, the case where the one-way interlocking mechanism 50 is configured by: the interlock pins 52 which are urged by the springs 53 functioning as an urging unit; and the interlock grooves 51 has been exemplarily described. However, any configuration may be employed as far as it can transmit a rotational force in one direction, and does not transmit the rotational force in the opposite direction.

The application is based on Japanese Patent Application No. 2010-258852filed Nov. 19, 2010 and Japanese Patent Application No. 2011-26906 filed Feb. 10, 2011, and their disclosures are incorporated herein by reference.

Description of Reference Numerals and Signs 10 pump housing
11 first housing member
12 second housing member
13 pump installation space
15, 17 suction port
16, 18 ejection port
20 mechanical pump
21 inner gear
23 outer gear
30, 130, 230, 330 electrical pump
33 rotor
35 inner gear
37 outer gear
40, 140 blocking plate
50 one-way interlocking mechanism
51 interlock groove
52 interlock pin
53 spring (urging unit)

The invention claimed is:

1. An oil pump apparatus wherein a mechanical pump including: an inner gear which is configured to be driven by an engine; and an outer gear which is configured to mesh with the inner gear, and an electrical pump including: an outer gear which is configured to be driven by a motor section; and an inner gear which is configured to mesh with the outer gear are installed adjacent to each other in an axial direction in a pump installation space of a pump housing having suction ports and ejection ports, and
 a blocking plate which is configured to block communications between the suction ports and the ejection ports is disposed between the mechanical pump and the electrical pump.

2. The oil pump apparatus according to claim 1, wherein a one-way interlocking mechanism is disposed between the mechanical pump and the electrical pump, the one-way interlocking mechanism transmitting a power from a side of the mechanical pump to a side of the electrical pump, but blocking power transmission from the side of the electrical pump to the side of the mechanical pump.

3. The oil pump apparatus according to claim 2, wherein the one-way interlocking mechanism includes: an interlock pin which is urged in a projection direction by an urging unit; and an interlock groove which is disengageably engaged with the interlock pin.

4. The oil pump apparatus according to claim 2, wherein the electrical pump is rotatable at a rotational speed that is higher than a speed at which the mechanical pump is rotated during operation of the engine.

5. The oil pump apparatus according to claim 3, wherein the electrical pump is rotatable at a rotational speed that is higher than a speed at which the mechanical pump is rotated during operation of the engine.

6. The oil pump apparatus according to claim 1, wherein the electrical pump is rotatable at a rotational speed that is higher than a speed at which the mechanical pump is rotated during operation of the engine.

7. The oil pump apparatus according to claim 1, wherein, during operation of the engine, an electric current is supplied to the motor section of the electrical pump, and the electrical pump is drivable.

\* \* \* \* \*